United States Patent [19]

Case et al.

[11] Patent Number: 4,777,587

[45] Date of Patent: Oct. 11, 1988

[54] SYSTEM FOR PROCESSING SINGLE-CYCLE BRANCH INSTRUCTION IN A PIPELINE HAVING RELATIVE, ABSOLUTE, INDIRECT AND TRAP ADDRESSES

[75] Inventors: Brian W. Case; Rod G. Fleck, both of Mountain View; Cheng-Gang Kong, San Jose, all of Calif.; Ole Moller, Nivaa, Denmark

[73] Assignee: Advanced Micro Devices, Inc., Sunnyvale, Calif.

[21] Appl. No.: 771,327

[22] Filed: Aug. 30, 1985

[51] Int. Cl.[4] .......................... G06F 9/00; G06F 9/38; G06F 9/42

[52] U.S. Cl. .................................................. 364/200

[58] Field of Search ... 364/200 MS File, 900 MS File, 364/300

[56] References Cited

U.S. PATENT DOCUMENTS

| | | | |
|---|---|---|---|
| 4,179,731 | 12/1979 | Yamazaki | 364/200 |
| 4,398,244 | 8/1983 | Chu et al. | 364/200 |
| 4,399,507 | 8/1983 | Cosgrove et al. | 364/200 |
| 4,471,431 | 9/1984 | Vogt | 364/200 |
| 4,498,136 | 2/1985 | Sproul, III | 364/200 |

Primary Examiner—Archie E. Williams, Jr.
Assistant Examiner—Robert B. Harrell
Attorney, Agent, or Firm—Kenneth B. Salomon; J. Vincent Tortolano

[57] ABSTRACT

An instruction processor suitable for use in a reduced instruction-set computer employs an instruction pipeline which performs conditional branching in a single processor cycle. The processor treats a branch condition as a normal instruction operand rather than a special case within a separate condition code register. The condition bit and the branch target address determine which instruction is to be fetched, the branch not taking effect until the next-following instruction is executed. In this manner, no replacement of the instruction which physically follows the branch instruction in the pipeline need be made, and the branch occurs within the single cycle of the pipeline allocated to it. A simple circuit implements this delayed-branch method. A computer incorporating the processor readily executes special-handling techniques for calls on subroutine, interrupts and traps.

8 Claims, 3 Drawing Sheets

SYSTEM FOR PROCESSING SINGLE-CYCLE BRANCH INSTRUCTION IN A PIPELINE HAVING RELATIVE, ABSOLUTE, INDIRECT AND TRAP ADDRESSES

This invention relates to method and apparatus for processing instructions for a digital computer, and more particularly, for processing branch instructions in a pipeline using only the single cycle allocated in the pipeline to the instruction without need for branch prediction or complex circuitry.

BACKGROUND OF THE INVENTION

Reduced instruction set computers (RISC) recognize the advantages of using simple decoding and the pipelined execution of instructions. Branch instructions are required in a computer to control the flow of instructions. A branch instruction in a pipelined computer will normally delay the pipeline until the instruction at the location to which the branch instruction transferred control, the "branch address", is fetched. As such, these instructions impede the normal pipelined flow of instructions. Known in the prior art are elaborate techniques which delay the effect of branches, "delayed branching", or predicting branches ahead of time and correcting for wrong predictions, or fetching multiple instructions until the direction of the branch is known.

Since most of these techniques are too complex for a RISC architecture, the delayed branch is chosen for it; the delayed branch allows RISC to always fetch the (physically) next instruction during the execution of the current instruction. As most RISCs employ pipelining of instructions, in the prior art delayed branching requires two instruction processor clock cycles to execute a branch instruction. This disrupts the instruction pipeline. Complex circuitry was introduced into the prior art to eliminate such disruption. Since branch instructions occur frequently within the instruction stream, prior art computers were slower and more complex than desired.

Since calls on subroutines and interrupt and trap routines similarly involve branching, the time penalties incurred in the prior art RISCs are also present for these commonly-occurring procedures. Accordingly, there is a need for an instruction processor suitable for use in a RISC which performs branches in a single cycle, and thus does not disrupt the instruction pipeline, while providing completely accurate branch prediction without requiring complex circuitry.

SUMMARY OF THE INVENTION

The instruction processor of the instant invention provides a program counter for use in a pipelined RISC in which branch instructions include a bit stored in a general-purpose register, instead of a condition code register, which allows the branch condition to be treated as a normal instruction operand, instead of as a special case within the condition code register. During the decode cycle of the branch instruction, the condition bit is fetched and the branch "target" address is computed by a separate relative address adder, or fetched from a register, depending on the type of branch instruction being executed.

At the beginning of the execution cycle of the branch instruction, the condition bit and target address control which instruction is to be fetched, the branch not taking effect until the next-following instruction is executed. A multiplexer implements this control. In this manner, no replacement of the instruction which physically follows the branch instruction in the pipeline need be made, and thus the pipeline can execute at the maximum rate without interruption. Accordingly, the branch occurs within the single cycle of the pipeline allocated to it.

A computer incorporating the processor of the present invention also readily executes special-handling techniques for calls on subroutines, interrupts and trap routines.

DETAILED DESCRIPTION OF THE PREFERRED EMBODIMENT

Figure 1:
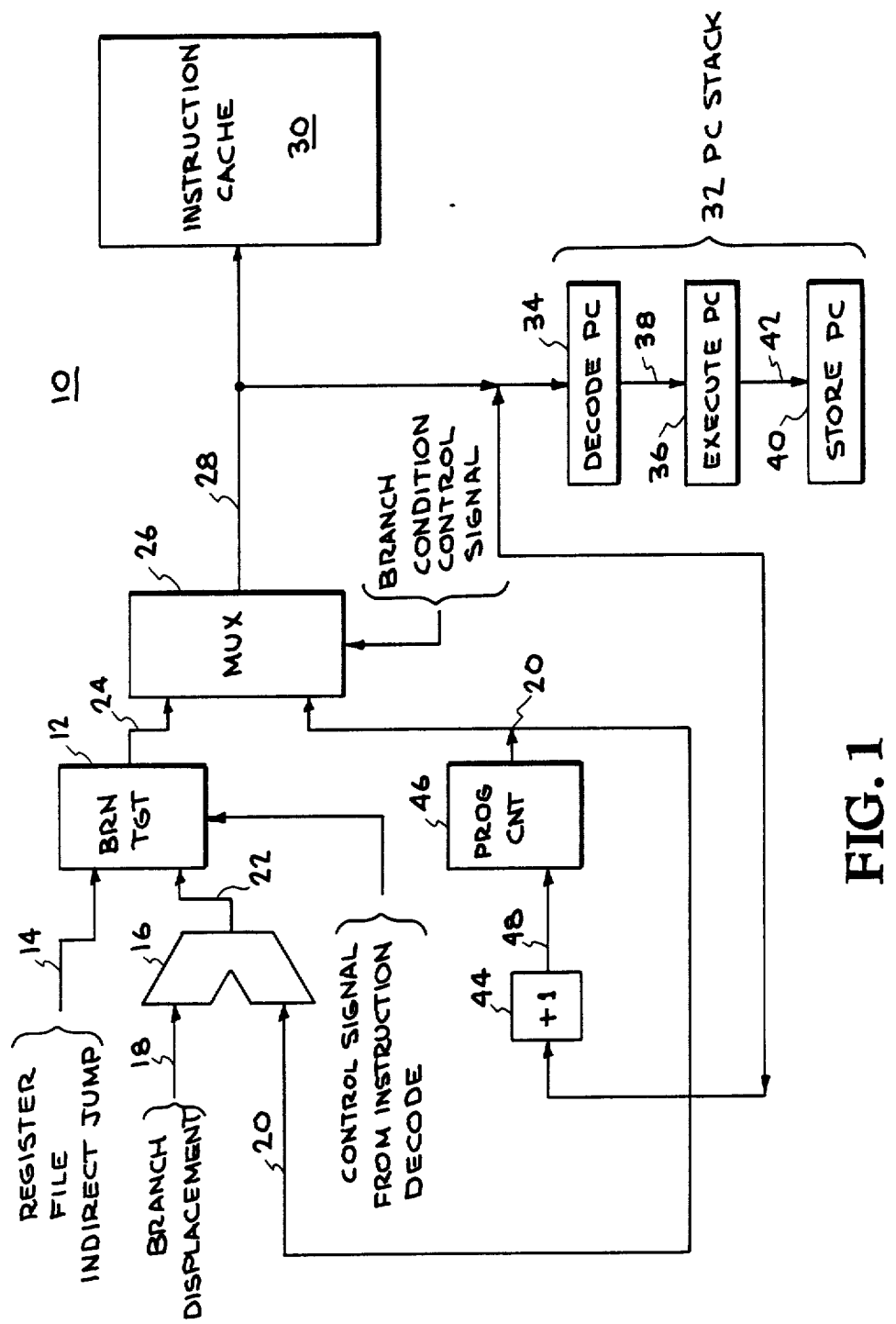
FIG. 1 is a block diagram of an instruction processor employing a program counter unit of the present invention providing single-cycle branching.

A program counter portion 10 of a digital processor control providing the single-cycle branch capability of the present invention is illustrated in block diagram form in FIG. 1. An instruction register, not shown in FIG. 1, contains the instruction which is currently being executed by processor 10. If this instruction calls for a branch to be executed, a branch condition will be stored in a predetermined bit position within a general-purpose register, not shown in FIG. 1, where it will be treated by the processor 10 as an instruction operand. During the instruction decode cycle of the processor 10, when a branch instruction is being decoded, the branch condition will be retrieved from the general-purpose register and used during the instruction execution cycle of processor 10. The branch condition and a target address, described below, are used to determine the location of the instruction to be executed next by processor 10. The simple logic illustrated in FIG. 1 permits an instruction pipeline to operate without disruption even in the case of an instruction calling for conditional branching.

The processor 10 executes branch instructions which can specify one of three branch destinations; a "relative or absolute branch address", an "indirect branch address", or a "trap address". A fourth "continue address" is simply that of the next-following instruction which will be executed if a branch is not undertaken. The paths illustrated in FIG. 1 show only the data flow between the indicated elements and are capable of conducting several signals in parallel. Control signal paths are also required, as will be appreciated by those skilled in the art, but are not shown in FIG. 1 because it is well known by those skilled in the art how to effect control of the various illustrated elements.

With reference to FIG. 1, processor 10 includes a branch target address (BRN TGT) multiplexer/register 12 which receives from a general-purpose register file, not shown in FIG. 1, via a data path 14 an address which contains the location to which a branch is to be made by processor 10, the so-called "indirect branch address". A second type of branch address, the so-called "relative or absolute branch address" is determined by an adder 16 which at a first input receives from the instruction register a branch displacement value via a data path 18. This value can be added to the address of the presently-executed instruction received at a second input to adder 16 via a data path 20, resulting in the relative branch address. Should an addition not be performed, only the branch displacement address will be generated by the adder 16, resulting in the absolute branch address. The address generated by adder 16 is conducted via a data path 22 to a second input of BRN TGT register/multiplexer 12.

The branch target address selected by BRN TGT register/multiplexer 12 as determined by a control signal generated by processor 10 in accordance with the branch instruction executed by processor 10 is generated at an output thereof and conducted via data path 24 to a first input of a multiplexer (MUX) 26 which has an output terminal connected via a data path 28 to an input terminal of an instruction cache 30. The instruction cache 30 contains a set of storage locations, 512 in the preferred embodiment, for storing sets of contiguous instructions which constitute a portion of the program being currently executed by processor 10. Application of an address at the input terminal of cache 30 causes the instruction stored at that address to be conducted to the instruction register of processor 10 to become the next instruction to be executed thereby.

Also receiving the address generated by MUX 26 is a program counter (PC) stack 32 comprising a decode PC register 34 to which is conducted via data path 28 the address generated by MUX 26, an execute PC register 36 to which is conducted via a data path 38 the contents of the decode PC register 34, and a store PC register 40 to which is conducted via a data path 42 the contents of the execute PC register 36. The PC stack 32 implements a four-stage instruction address pipeline, as will be described below in connection with FIG. 2.

Also receiving the address generated by MUX 26 is an address incrementer (+1) 44 which generates at an output the address applied to it via data path 28 incremented by 1, i.e., the continue address. A program counter (PROG CNT) register 46 receives the continue address generated by increment 44 via a data path 48 and stores this address. The continue address is generated at an output of the PROG CNT register 46 and conducted via data path 20 to the second input of adder 16 and a second input of MUX 26.

The MUX 26 receives a control signal based on the branch condition, described above, to determine whether the branch target address applied on data path 24 or the continue address applied on data path 20 will be applied to the instruction cache 30 to fetch the next instruction to be executed by processor 10. An instruction calling for a branch will be processed by processor 10 so that the branch does not occur until the instruction following the branch instruction is executed. In this manner, the instruction pipeline, implemented by the PC stack pipeline 32, operates without interruption even when a branch instruction enters the pipeline, since no replacement of the instruction which normally follows the branch instruction need be made in the pipeline. Accordingly, the branch occurs within the single cycle of the pipeline allocated to it, as will be described in connection with FIG. 2.

A four-stage pipeline is used by the processor 10 of the instant invention; an instruction fetch stage, an instruction decode stage, an instruction execution stage, and a data storage stage. The various stages of the instruction pipeline employed by processor 10 are shown in FIG. 2, illustrating the execution of a branch instruction.

By employing a so-called "delayed branching" technique, the processor 10 can effect execution of a branch instruction in a single processor cycle without requiring complex logic circuitry. The space between the vertical dashed lines in FIG. 2 corresponds to a single processor cycle, each cycle having an equal duration. Shown extending from $t_0$ to $t_1$ during the first cycle of the processor 10 is "BRANCH 1" in which a branch instruction is fetched from instruction cache 30 and stored in the instruction register of processor 10. Shown extending from $t_1$ to $t_2$ during the second cycle of the processor 10 "BRANCH 2" is the decoding of the branch instruction stored in the instruction register. The branch condition needed by the instruction is retrieved from the general-purpose register described above and the branch target address specified by the instruction is determined, as described above, and conducted on data bus 24 to the first input of MUX 26.

During the execution cycle of the branch instruction extending from $t_2$ to $t_3$ "BRANCH 3", the condition causes processor 10 to generate a control signal which, in turn, causes MUX 26 to select either the branch target address or the continue address to be conducted to the instruction cache 30 for use in fetching the next (logical) instruction. During the storeback cycle, extending from $t_3$ to $t_4$, the instruction (physically) following the branch instruction is in the execute stage of processor 10.

Figure 2:
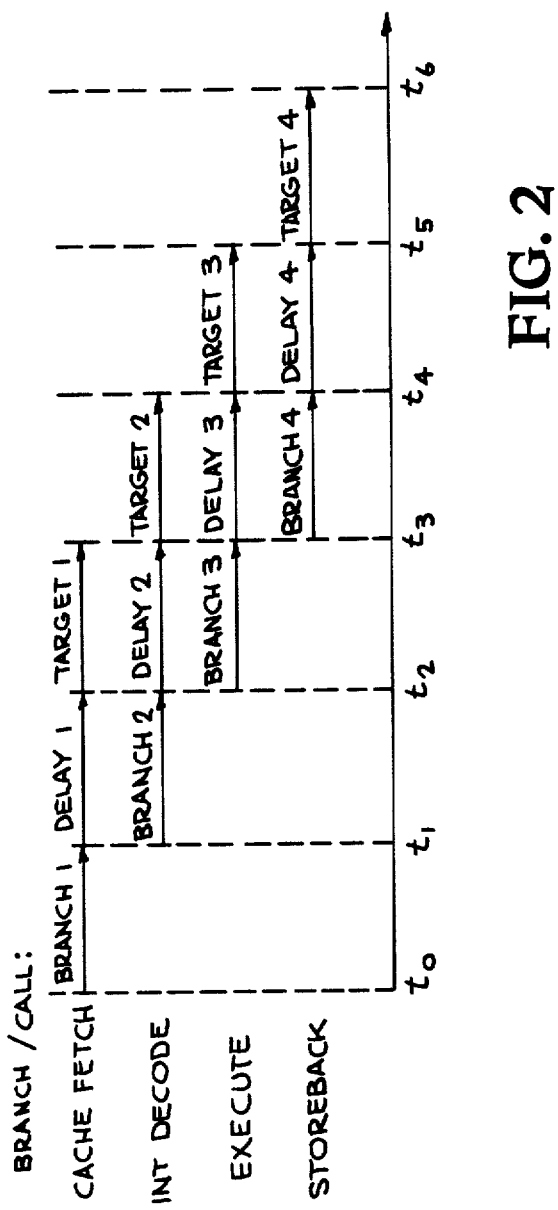
FIG. 2 is a timing diagram of the pipeline stages during processing of a branch instruction by the instruction processor of the present invention.

As shown in FIG. 2, a branch delay instruction "DELAY" physically follows the branch instruction and is always executed; the branch itself not occurring until after the branch delay instruction, whereupon the instruction to which the branch instruction passes control "TARGET" executes. In this manner, the processor 10 can always fetch the next instruction during the execution of the current instruction, i.e., operate in a pipeline mode without the need to interrupt the pipeline nor retract the fetching of an instruction. Accordingly, FIG. 2 indicates that during the second cycle "DELAY 1" processor 10 fetches from cache 30 the instruction physically following the branch instruction whose fetching, decoding, execution and storeback cycles were just described. This instruction thus occupies the stage in the pipeline immediately following the branch instruction which preceded it. Hence, the decoding, execution and storeback cycles for the branch delay instruction "DELAY 2", "DELAY 3" and "DELAY 4" will occur during the third, fourth and fifth cycles of processor 10 as shown in FIG. 2.

The instruction to which control passes by virtue of the branch instruction, "TARGET", will occupy the stage in the pipeline immediately following the delay instruction, as shown in FIG. 2. Thus the fetching, decoding, execution and storeback cycles for the TARGET instruction "TARGET 1", "TARGET 2", "TARGET 3", and "TARGET 4", will occur during the fourth, fifth and sixth cycles of processor 10 as shown in FIG. 2. The serial connection of the decode PC register 34, the execute PC register 36 and the store PC register 40, clocked at the intervals $t_0, t_1, ..., t_6$ implement the pipeline described above by storing the addresses of instructions associated with the corresponding pipeline stages.

The processor 10 of the instant invention can execute a branch which is called for by a call subroutine instruction by a modification of the delayed branching technique described above in connection with FIG. 2. The call subroutine instruction is fetched from the cache 30 and stored in the instruction register during the first cycle of processor 10 extending from $t_0$ to $t_1$; denoted as "BRANCH 1" in FIG. 2. During the second cycle of the processor 10, the call subroutine instruction, "BRANCH 2", is decoded and the contents of the PROG CNT register 46 is generated on data path 20, and via MUX 26, onto data path 28 for entry into a data path pipeline, not shown in FIG. 1. During the third cycle of the processor 10 "BRANCH 3", the contents of the PROG CNT register are increased by four in an arithmetic logic unit of the processor 10, not shown in FIG. 2, to establish a return address from the subroutine. During the fourth cycle of the processor 10 "BRANCH 4", the return address is saved in a general-purpose register. In all other respects, the technique for executing a call subroutine instruction is as described above in connection with FIG. 2 for executing a branch instruction, where the instruction to which control passes by virtue of the call subroutine instruction, "TARGET", wil be the first instruction of the subroutine.

As the processor 10 of the present invention is capable of servicing interrupts and traps, special consideration must be given to the occurrence of an interrupt or trap between a branch or a call subroutine instruction and the delayed-branch instruction which follows it. In this case, the processor 10 must cause the delayed-branch instruction to be executed after return from the interrupt or trap routine, in addition to the target instruction to which control passes by virtue of the branch or call instruction. To assure this result when returning from an interrupt or trap routine, processor 10 must execute two branches: a first branch causes execution of the branch delay instruction which was preempted by the occurrence of the interrupt or trap, and a second branch which causes execution of the target instruction which followed the delayed-branch instruction.

Figure 3A:
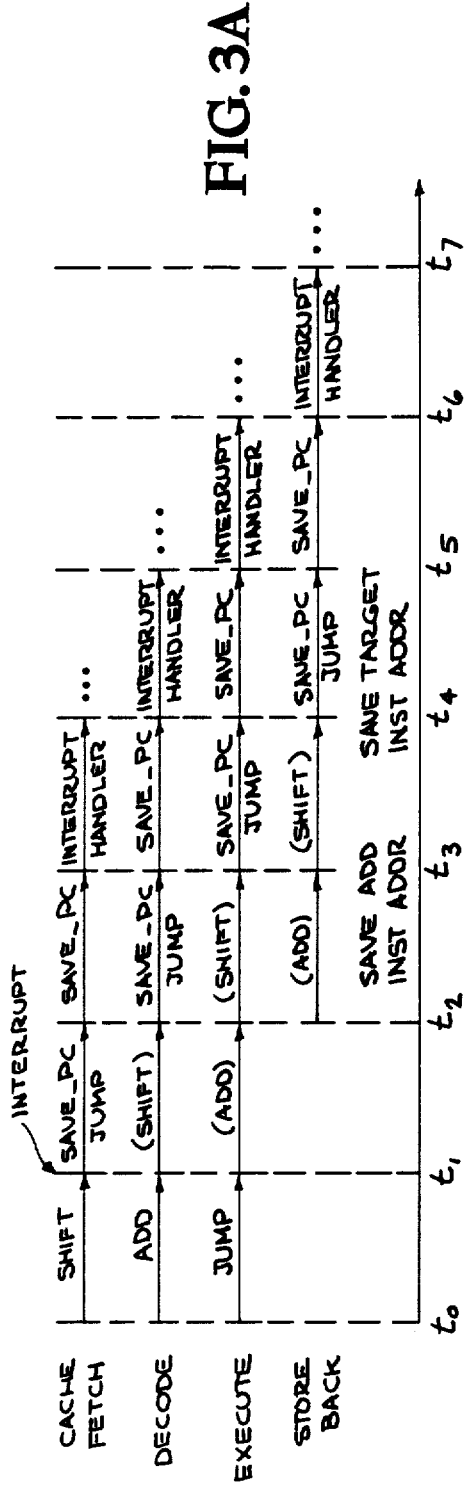
FIGS. 3a and 3b are a composite timing diagram of the pipeline stages during the processing of an interrupt routine by the instruction processor, and during return from the interrupt routine.
Figure 3B:
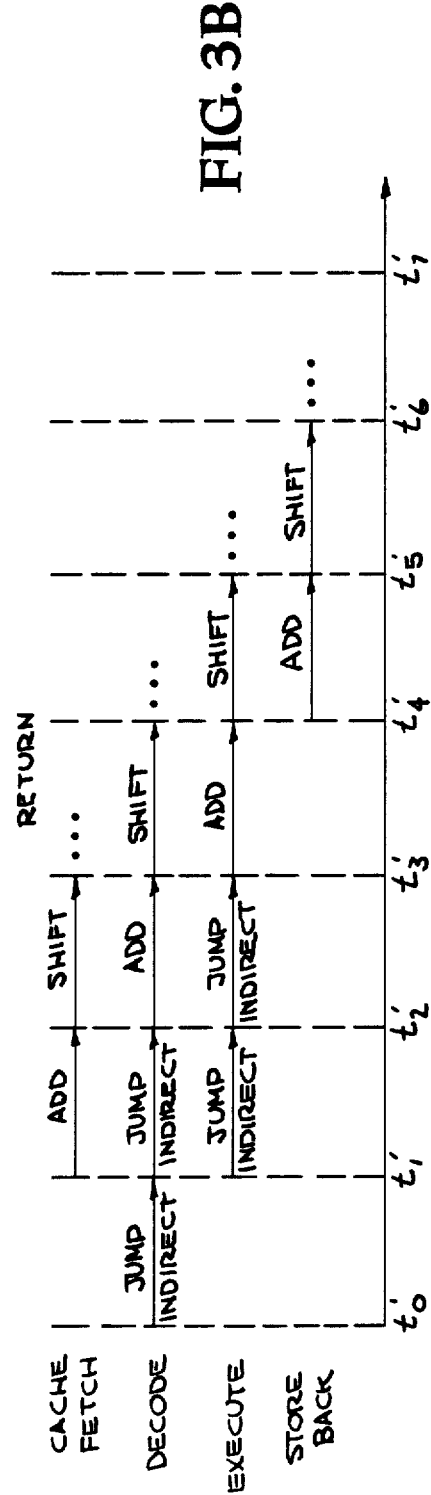

The various stages of the instruction pipeline employed by processor 10 to effect execution of an interrupt or trap routine occurring between a branch or subroutine call instruction and the delayed-branch instruction which follows it are illustrated in FIG. 3A. The pipeline stages employed by processor 10 to effect return from the interrupt or trap routine are illustrated in FIG. 3B. With reference to FIG. 3A, the operation of processor 10 is illustrated by an interrupt occurring at time $t_1$. Modifications to the latter procedure will not be described herein as they can be provided by those skilled in the art. For purposes of illustration, a shift instruction is shown as fetched from instruction cache 30 in the preceding cycle extending from $t_0$ to $t_1$. The pipeline also contains, for purposes of illustration, a jump instruction, followed by an add instruction, followed by the shift instruction. Since the jump instruction was executed just before occurrence of the interrupt and the add and shift instructions had yet to be executed, it will be necessary for processor 10 to return from the interrupt routine and then execute the add and shift instructions. The addresses of these instructions must be saved before transfer to the interrupt routine. Accordingly, a "SAVE_PC_JUMP" instruction is indicated in FIG. 3A as fetched during the cycle extending from $t_1$ to $t_2$, following occurrence of the interrupt. This will cause processor 10 to save the address of the branch delay instruction, namely the add instruction which was to execute during the cycle extending from $t_1$ to $t_2$ following occurrence of the interrupt. The contents of the execute PC register 36 (FIG. 1) portion of the PC stack 32 will accordingly be saved. Also, the "SAVE_PC JUMP" instruction will cause processor 10 to generate the contents of the BRN TGT multiplexer/register 12 onto data path 24, and via MUX 26, onto data path 28 and therefrom to instruction cache 30. These contents being the address of the first instruction of the interrupt routine. As shown in FIG. 3A, processor 10 will fetch during the cycle extending from $t_2$ to $t_3$ a "SAVE_PC" instruction, which will cause processor 10 to save the addresss of the target instruction, namely, the shift instruction, which would have normally followed the add instruction. The first instruction of the interrupt routine, designated the "INTERRUPT HANDLER" in FIG. 3A, will then be fetched by processor 10 during the cycle extending from $t_3$ to $t_4$.

The decoding and execution of the shift and add instructions, respectively, are accordingly aborted as indicated in FIG. 3A by the designations "(ADD)" and (SHIFT)" during the decoding and execution stages. During subsequent store back stages, the "SAVE_PC_JUMP" and "SAVE_PC" instructions cause processor 10 to save the addresses of the add instruction and the shift instruction, as indicated in FIG. 3A.

With reference to FIG. 3B, the interrupt routine will complete by causing the processor 10 to fetch two jump indirect instructions, which are shown in FIG. 3B as being decoded during the cycles extending from $t_0'$ to $t_1'$ and $t_1'$ to $t_2'$. To return from the interrupt routine then, processor 10 will perform an indirect jump via the value saved by the "SAVE_PC" instruction described in connection with FIG. 3A and will accordingly fetch the add instruction from cache 30 during the cycle extending from $t_1'$ to $t_2'$ and will perform an indirect jump via the value saved by the "SAVE_PC_JUMP" instruction and will accordingly fetch the shift instruction from cache 30 during the cycle extending from $t_2'$ to $t_3'$ as shown in FIG. 3B. Thus, the processor 10 will execute these instructions in their order of occurrence in the pipeline just prior to the occurrence of the interrupt.

We claim:

1. A digital instruction processor control which cyclically executes, in a single cycle, instructions from a set, including a plurality of plural-bit branch instructions, stored in an instruction cache having a plurality of locations each with a designator, said processor control comprising:

means for generating signals indicative of a "continue with instruction" address;

means responsive to continue address signals and to predetermined bit portions of said branch instructions for generating signals indicative of a "branch target" address; and first multiplexer means having an output terminal connected to said instruction cache responsive to a control signal indicative of contents of a predetermined "condition" bit portion of said branch instruction, responsive to branch target address signals applied to a first input terminal of said first multiplexer means and responsive to said continue address signals applied to a second input terminal of said first multiplexer means for selectively conducting to said output terminal one of said address signals indicative of a location within said instruction cache from which to fetch a next instruction to be processed by said instruction processor;

wherein said branch target address generating means comprises:

second multiplexer/register means having an output terminal connected to said first input terminal of said first multiplexer means responsive to a control signal indicative of which of said plurality of branch instructions is being executed, responsive to signals applied to a first input terminal indicative of an "indirect address" determined by said branch instructions, and responsive to signals applied to a second input terminal indicative of a "relative or absolute branch address" for selectively conducting to said output terminal one of said address signals indicative of said branch target address; and adder means having an output terminal connected to said second input terminal of said second multiplexer/register means responsive to said control signal indicative of which of said plurality of branch instructions is being executed, responsive to signals applied to a first input terminal indicative of a "branch displacement" portion of said branch instructions, and responsive to said continue address signals applied to a second input terminal for selectively generating at said output terminal said relative or absolute branch address.

2. A digital instruction processor control according to claim 1 further including means connected to said output terminal of said first multiplexer means for storing at least three signals indicative of instruction cache location designators, each instruction therein designated occupying a stage in an instruction "pipeline", for generating signals representative of contents stored therein, and for updating the contents of said location designators stored therein so that said instruction cache location designators conducted by said first multiplexer during a preceding cycle of said instruction processor replaces contents of a first storage location thereof, the instruction cache location designator stored in said first storage location replaces the contents of a second storage location, and the instruction cache location designator stored in said second storage location replaces contents of a third storage location.

3. A digital instruction processor according to claim 2 wherein (said pipeline) comprises a first clocked register having an input terminal connected to said output terminal of said first multiplexer means and an output terminal, a second clocked register having an input terminal connected to said output terminal of said first register and an output terminal, and a third register having an input terminal connected to said output terminal of said second register.

4. A method of performing branches in one cycle of a digital instruction processor control having an instruction pipeline and a program counter, which cyclically executes instructions from a set, including a "branch delay" instruction and a plurality of branch instructions each determining a "branch condition", stored in an instruction cache having a plurality of locations each with a designator, comprising steps of:

(a) fetching from said cache at a location designator specified by contents of said program counter a branch instruction placing said instruction in said instruction pipeline and placing said branch delay instruction on said instruction pipeline during a next-following cycle;

(b) decoding said branch instruction stored in said instruction pipeline;

(c) saving said branch condition determined by said branch instruction;

(d) selecting a branch target address from an indirect, relative and absolute branch address based on information generated at decoding step (b);

(e) fetching an instruction from a location in said cache selected from said branch target address determined at step (d) and the contents of said program counter, based on said branch condition saved at step (c) and placing a fetched instruction in said instruction pipeline during a cycle next-following a cycle during which said branch delay was placed in said pipeline; and (f) replacing the contents of the program counter with the address used to fetch said instruction at step (e) incremented by one.

5. A one-cycle branching method according to claim 4 further including a method for calling a procedure in one cycle wherein said instructions from a set further includes a procedure call instruction, wherein step (a) calls for fetching said procedure call instruction, said method further including steps of:

(g) determining a call return address based on information generated at decoding step (b) and contents of said program counter; and (h) saving said call return address determined at step (g).

6. A method of processing an interrupt routine by a digital instruction processor control having an instruction pipeline, which cyclically executes instructions from a set, including an interrupt procedure call instruction, a "branch delay" instruction and a plurality of branch instructions each determining a "branch condition", stored in an instruction cache having a plurality of locations each with a designator, wherein said interrupt routine is to be processed between a branch instruction placed in said pipeline one cycle prior to occurrence of said interrupt, and having a branch target address and a branch delay instruction placed in said pipeline to two cycles prior to the occurence of said interrupt, comprising steps of:

(a) saving a location designator of a branch target instruction;

(b) saving said branch target address;

(c) processing said interrupt routine;

(d) prior to returning from said interrupt routine fetching for said pipeline an instruction located at the location designator saved at step (a); and (e) prior to returning from said interrupt routine fetching for said pipeline the instruction located at the location designator saved at step (b).

7. An interrupt processing method according to claim 6, further including steps of:

(f) following return from said interrupt routine fetching from said cache at the location designator saved at step (a) a first indirect branching instruction and placing said instruction in said instruction pipeline; and (g) following return from said interrupt routine fetching from said cache at the location designator saved at step (b) a second indirect branching instruction and placing said instruction in said instruction pipeline.

8. An interrupt processing method according to claim 7, wherein said instruction processor control has a program counter, and wherein fetching step (f) comprises steps of:
 (f1) fetching from said cache at the location designator specified by contents of said program counter said first indirect branch instruction and storing said instruction in an instruction register;
 (f2) decoding said instruction stored in said instruction register; and
 (f3) determining an indirect branch address based on information generated at decoding step (f2);

and wherein fetching step (g) comprises steps of:
 (g1) fetching an instruction from a location in said cache determined from said second indirect branch address determined at step (f3); and
 (g2) replacing the contents of the program counter with the address used to fetch said instruction at step (g1) incremented by one.

* * * * *